United States Patent [19]

Wakeman

[11] Patent Number: 4,776,962
[45] Date of Patent: Oct. 11, 1988

[54] FILTERING APPARATUS AND METHOD
[75] Inventor: Richard J. Wakeman, Winslade Park, England
[73] Assignee: James Howden & Company Limited, a British Company, Glasgow, Scotland
[21] Appl. No.: 80,773
[22] Filed: Aug. 3, 1987
[30] Foreign Application Priority Data Aug. 4, 1986 [GB] United Kingdom ................. 8619000

[51] Int. Cl.⁴ ........................ B01D 25/06; B01D 29/38
[52] U.S. Cl. ..................................... 210/748; 210/798; 210/243; 210/351; 210/411
[58] Field of Search ............... 210/673, 678, 691, 748, 210/797, 798, 275, 350, 351, 411, 412, 243, 352

[56] References Cited

U.S. PATENT DOCUMENTS

| | | | |
|---|---|---|---|
| 191,131 | 5/1877 | Gainey | 210/350 |
| 3,268,080 | 8/1966 | Eberly | 210/180 |
| 3,278,031 | 10/1966 | Rosaen | 210/350 X |
| 3,374,052 | 3/1968 | Fan et al. | 55/475 X |
| 3,747,769 | 7/1973 | Brumfield | 210/350 |
| 4,022,694 | 5/1977 | Fruman | 210/350 |
| 4,253,947 | 3/1981 | Fan et al. | 210/610 |
| 4,350,590 | 9/1982 | Robinson | 210/243 |
| 4,591,436 | 5/1986 | Hofstede | 210/350 X |

FOREIGN PATENT DOCUMENTS

| | | |
|---|---|---|
| 0100994 | 2/1984 | European Pat. Off. . |
| 86675 | 5/1896 | Fed. Rep. of Germany . |
| 3004614 | 8/1981 | Fed. Rep. of Germany . |
| 971412 | 11/1982 | U.S.S.R. ............... 210/350 |

Primary Examiner—Robert Spitzer
Attorney, Agent, or Firm—Harness, Dickey & Pierce

[57] ABSTRACT

A filtering method and apparatus including a chamber having an inlet and an outlet and a mass of fibers interposed between the inlet and outlet and contained between a perforated base and piston. Structure is provided for reciprocating the piston relative to the base during backwash operation.

16 Claims, 1 Drawing Sheet

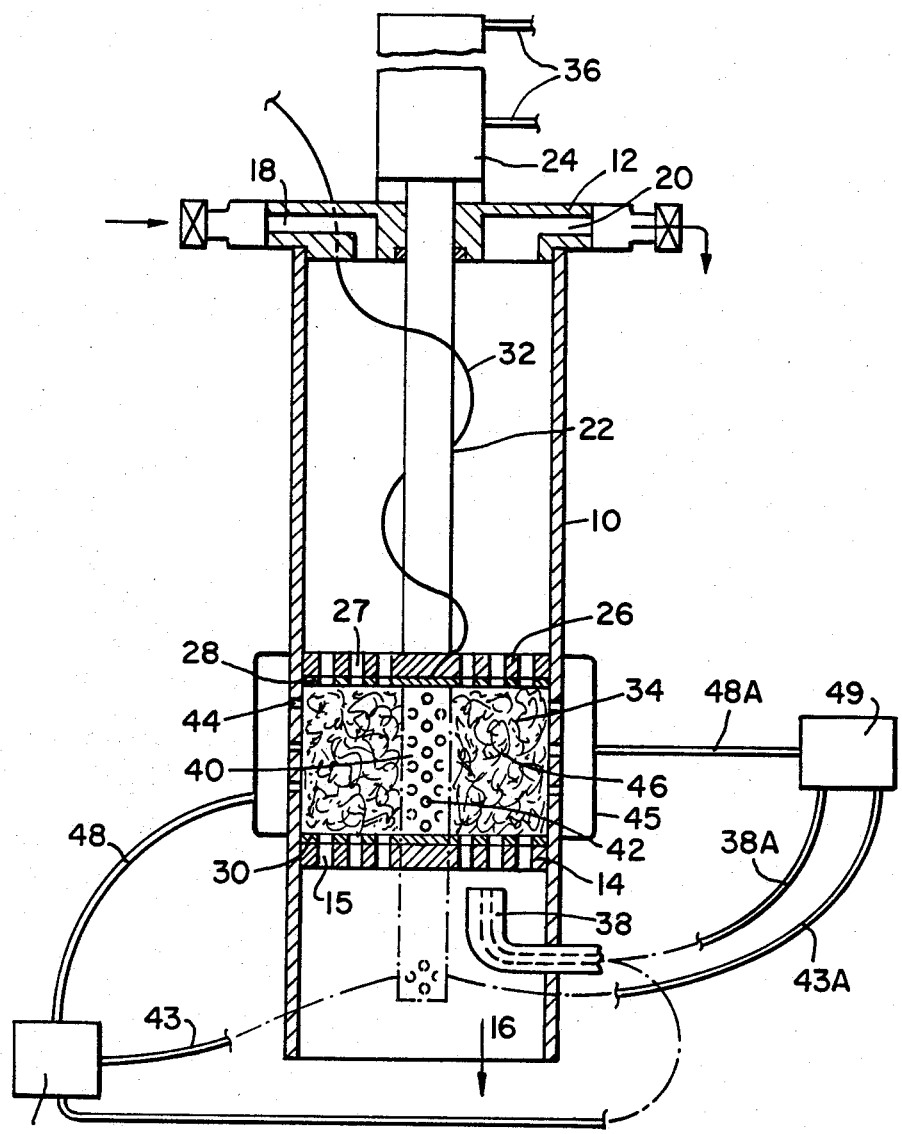

FILTERING APPARATUS AND METHOD

BACKGROUND OF THE INVENTION

The present invention relates to a filtering apparatus and method.

Solid-liquid separation and concentration technology play an important role in industry, especially in the treatment of fine particles and colloids from dilute suspensions. Chemical processes which filter volumes of liquid mixtures containing solid or cellular suspensions suffer severely from plugging and colloidal fouling of the filter medium. For example, an important factor contributing to the successful running of any reverse osmosis plant is the quality of the pre-treatment of the feed. Reverse osmosis depends on having a clean flow of water to the membrane surface. If this does not occur, the membrane will very quickly become fouled, leading to loss in water flux and the need for a complete replacement of the membrane. Other areas where this technology plays an important role are in biotechnological downstream processes, food and drink manufacture, the production of ultra-pure water for use in the semi-conductor industry, boiler feed water production and water flood injection for secondary recovery on off-shore oil production platforms. In a very large proportion of chemical processes there is a need to filter solids which have been used in the process or are created during the process away from the desired liquid which itself must be of the highest purity. Similarly, in the drinks industry, it is very often of the utmost importance to remove any solids, especially yeast, to give the highest quality drink. The present invention is directed to a method and apparatus for filtering, which term is used herein to include clarifying and polishing.

Existing processes have suffered a number of disadvantages particularly in removing the filtered solid material or filter cake, from the filtering medium and unless this can be satisfactorily carried out a high quality filtering cannot be successfully achieved.

SUMMARY OF THE INVENTION

It is now proposed, according to the present invention, to provide a filtering apparatus comprising a chamber having an inlet and a filtrate outlet, a perforated base, a perforated piston, spaced from said base, said base and piston extending across said chamber between the inlet and the outlet, a mass of fibres filling the space between said base and piston, means to move said piston away from and towards said base, to enlarge and reduce the size of said space, and means to cause a backwash of fluid through said space in a direction generally away from said base, or piston (whichever is nearer the filtrate outlet) and towards said inlet.

The apparatus of the present invention makes use of a mass of fibres for carrying out the filtering operation and these can be compacted very tightly within the chamber by the piston so that very small particle size solids can be filtered out. However, this would normally produce the difficulty of removing these solids, when it is needed to clean the filter. The apparatus of the present invention enables this problem to be overcome because the piston can be moved away from the base to enlarge and reduce the size of the space therebetween, thereby to separate the fibers of the mass from one another so that they can move freely relative to one another and so that the backwash fluid can therefore take with it the solids which have been filtered out by the mass of fibres. The effect is enhanced if the space between the base and piston is subsequently reduced in size and then enlarged several times.

Advantageously the fibres are electrically conducting fibres and a particularly suitable form of such fibres are carbon fibres. The use of an electrically conducting fibre, especially a carbon fibre, enables one to take advantage of mounting electrodes on the piston and the base and applying an electrical potential between the electrodes, so that an electrical field is set up in the space and thus in the mass of fibres. It has been found that this produces an even better filtering effect. It is presumed that this is because ions are attracted to the electrically conducted fibres which are lightly charged due to the electric field across them. The polarity can be chosen to suit the particular material being filtered.

During the backwashing action it is advantageous for the polarity to be reversed thereby releasing the solid particles which had been attracted to the electrically conducting carbon fibres.

The actual construction of the apparatus can take many forms. For example the piston can either be linearly reciprocable or can be pivotally reciprocable, for instance in a semi- or part-circular chamber, but the linearly reciprocable piston is preferred and its movement can be effected, for example, by a pneumatic piston and cylinder arrangement.

It will be appreciated that during the forward movement of the fluid to be filtered, it first passes through the perforations in either the piston or the base, whichever comes first in the direction of flow, then through the filter bed formed by the mass fibres, and then through the other of the perforated base and piston.

During the backwashing cycle, a flow of backwash fluid is caused to move generally away from the base or piston, whichever is nearer the filtrate outlet, and towards the inlet. This flow may be entirely, or in part only, introduced into the chamber by passing through the base or piston (whichever is nearer the filtrate outlet) remote from the space. This ensures that none of the solid particles released from the mass of fibres will contaminate the filtrate outlet side of the chamber. However, some of the backwash fluid may be introduced into the space in a direction transverse to the direction of movement of the piston, either internally of the mass or from the exterior of the mass of fibres within the space. Thus the piston may be provided with a piston rod which extends through the space and this may be provided with an internal duct to introduce backwash fluid outwardly through apertures in the piston rod. Alternatively, or additionally, means may be provided in the wall of the chamber to introduce backwash fluid laterally through these walls into the space.

Advantageously, a backwash outlet is provided adjacent the inlet for discharging the solid materials removed from the fibres during the backwash.

The invention also provides a method of filtering comprising feeding a liquid to be filtered through a mass of fibrous material in a forward direction and, from time to time cleaning the mass of fibrous material by alternate expansion and compaction thereof, while concurrently passing a clean backwash fluid through the mass of fibrous material.

As indicated the fibrous mass used may consist of electrically conductive fibres, such as carbon fibres and an electrical potential may be applied across the fibrous mass and the polarity of this can be altered during backwashing. It is also contemplated that sterilising and/or sanitising chemicals may be included in the reverse flow fluid to sterilise and/or sanitise the fibrous bed and its containing chamber. Alternatively, or additionally, steam at an adequate pressure and/or temperature may be included in the reverse flowing fluid to effect sterilisation of the fibrous bed and its containing chamber.

It is also contemplated that ion exchange particles or solution decolourising particles, such as activated carbon particles, may be included in the fibrous mass or, indeed, may be included in a separate space upstream or downstream of the fibrous mass these or other particles may be used to de-colourise the filtrate and, if desired, chemicals may be included in the reverse flowing backwash fluid to regenerate the ion exchange particles or solution de-colourising particles wherever the latter may be placed.

BRIEF DESCRIPTION OF THE DRAWINGS

In order that the present invention may more readily be understood, the following description is given, merely by way of example, reference being made to the accompanying drawing, in which the sole figure is a schematic side elevation, in section, of one embodiment of apparatus according to the invention.

DETAILED DESCRIPTION OF THE PREFERRED EMBODIMENTS OF THE INVENTION

The apparatus illustrated comprises a chamber 10 which is shown in the form of a vertically extending cylinder, which is provided at its top with a cover 12 and at its bottom with a fixed perforated base 14 having perforations 15. Extending below the perforated base 14 is a filtrate outlet 16. The cover 12 is provided with an inlet 18 for the fluid to be filtered and a second outlet 20 for discharging solids cleaned from the filter as will be described later.

Axially slidable within the cover 12, and provided with suitable seals (not shown) is a vertically extending piston rod 22, which is connected to a pneumatic piston and cylinder arrangement 24, for vertical reciprocation thereby. The piston rod 22 has mounted thereon a perforated piston 26 in which perforations 27 can be seen. The piston carries an upper perforated electrode 28, the perforations of which are in register with the perforations 27. Similarly a lower perforated electrode 30 is mounted on the base and has its perforations in register with the perforations 15 of the base 14. The perforated electrodes 28 and 30 may be connected to a suitable source of electrical power such as the conductor 32 which is connected to the electrode 28.

A filter mass in the form of a thick wad of carbon fibres is indicated by the general reference numeral 34 and is included in the chamber between the perforated base 14 and the perforated piston 26.

Pneumatic or hydraulic lines 36 are shown connected to the pneumatic or hydraulic piston and cylinder arrangement 24.

Extending upwardly into the filtrate outlet 16 is a main backwash feed pipe 38. Shown in phantom in the drawing is a piston rod extension 40 which is provided with several apertures 42. The piston is shown connected by means of a hose 43 to a clean backwash fluid supply. Similarly the chamber wall may be provided with backwash feed apertures 44 surrounded by a manifold 45 which is similarly connected to the backwash fluid supply 47 by a hose 48, for a reason to be explained later. Air or gas supply pipes 38A, 43A, 48A may be connected to a supply 49 of air or gas in parallel with the supply of backwash fluid. While three air or gas supply pipes have been shown, normally only one such pipe would be provided. As an alternative, air or gas may be caused to flow into the backwash fluid further upstream in the supply of this fluid.

In operation the pneumatic piston and cylinder arrangement 24 is actuated so that piston rod 22 is forced downwardly, whereby the perforated piston 26 tightly compresses the carbon fibre mass 34 against the base. Fluid to be filtered is fed in through the inlet 18 and passes downwardly in the chamber 10 through the perforations 27 in the piston 26 and its associated upper electrode 28 and then through the carbon fibre mass 34. The filtrate leaves via the perforations 15 in the perforated base 14 and its associated lower electrode 30, to be discharged via the filtrate outlet 16. During this operation, if desired, an electric field may be produced across the filter mass 34 by applying an electrical potential between the upper electrode 28 and the lower electrode 30. The polarity of this can be chosen to suit the material being filtered, so that solid particles in this fluid will be attracted to the carbon fibres.

From time to time it will be necessary to clean the filter and this is achieved by turning off the flow of fluid to the inlet 18 and then operating the pneumatic or hydraulic piston and cylinder arrangement 24 to cause the piston 26 to rise thereby enlarging the space 46 in which the carbon fibre mass 34 is located, that is the space within the chamber above the base 14 and below the piston 26. This will cause the fibres to separate from one another. While this separation is taking place, clean backwash fluid is passed in through the backwash feed pipe 38 and, if desired, also through the apertures 42 and/or the apertures 44. Backwash fluid will loosen the solid particles which have been extracted by the carbon fibre mass and the backwash flow will pass out through the second outlet 20 in the cover to be discharged as appropriate. Advantageously the piston 26 is reciprocated a number of times during this backwash alternately to enlarge and reduce the size of the space 46 so that the fibres are compacted and loosened alternately. The stroke of the piston and the speed of its reciprocation may be varied, either to suit a particular filtering operation and/or during a particular backwash. At the same time, the electrical potential appearing across the electrodes 28 and 30 may either be removed or reversed or its polarity alternated.

It is important that the backwash should always be away from the base but nonetheless the actual flow of backwash fluid need only include a minor proportion through the main backwash feed pipe and, if desired, a major portion could be fed through the apertures 42 and/or 44. It is also possible to inject air or gas into the bed during backwashing, either through any of the supply pipes 38A, 43A, 48A or it may be mixed with the backwash fluid earlier in the supply. This assists in more uniform expansion of the bed.

It is contemplated that one could include a number of other components in the filtering mass for example activated carbon particles, which could be used to assist in polishing and in de-colouring a filtrate and the backwash can include the chemicals or steam to regenerate or sterilise the ion exchange particles and/or the fibres in the mass 34. It is also contemplated that a second piston could be provided and that this could have on one side the carbon fibres and on the other side carbon particles and that the movement of the second piston could be made independently or simultaneously of the main piston. This could be achieved, for example, by having a lost motion connection between such a second piston and the piston rod extension 40, so that, as the piston 26 first rises, the second piston could initially remain stationary and then subsequently rise during the latter part of the upward movement of the piston 26. The operation would then take place in reverse when the piston rod in lowered.

It is also contemplated that the enlargement and contraction of the size of the chamber 46 could be augmented by reciprocation of the base.

While the piston has been shown at the top and the fixed base at the bottom, the orientation is of little consequence. Similarly while the arrangement has been shown such that the fluid to be filtered moves first through the movable piston, the operation could equally be such that it moves through the fixed base first, then through the filter mass 34 and finally through the movable piston.

The chamber could alternatively be arranged horizontally and the backwash fluid could be transverse to the direction of movement of the piston.

I claim:

1. A method of filtering a liquid comprising the steps of feeding said liquid to be filtered through a mass of fibrous material in a forward direction and, from time to time, cleaning the mass of fibrous material by alternate expansion and compaction thereof, while concurrently passing a clean backwash fluid through the mass of fibrous material.

2. A method as claimed in claim 1, wherein the fibrous mass consists of electrically conductive fibres and further comprising the step of applying an electrical potential across the fibrous mass.

3. A method as claimed in claim 2, and further comprising the step of alternating the polarity of said potential during the backwashing.

4. A method as claimed in claim 1, and further comprising the step of including sterilising and/or santising chemicals in the backwash fluid to sterilise and/or sanitise the fibrous mass and the containing chamber.

5. A method as claimed in claim 1, and further comprising the step of feeding steam at an adequate pressure and temperature with the backwash fluid to effect sterilisation of the mass of fibres and its containing chamber.

6. Filtering apparatus comprising a chamber, a fluid inlet and a filtrate outlet connected to said chamber, a perforated base, a perforated piston, spaced from said base, said base and piston extending across said chamber between the inlet and the outlet and defining therewith a space, a mass of fibres filling said space between said base and piston, means to positively move said piston away from and towards said base, to enlarge and reduce the size of said space, and means to cause a backwash of fluid through said space in a direction generally away the filtrate outlet and towards said inlet.

7. Apparatus as claimed in claim 6, wherein said fibres are electrically conductive fibres.

8. Apparatus as claimed in claim 7, wherein said fibres are carbon fibres.

9. Apparatus as claimed in claim 7 and further comprising electrodes are mounted on said piston and base and means to apply an electrical potential between said electrodes.

10. Apparatus as claimed in claim 6 and further comprising a fluid pressure operated piston and cylinder arrangement for linearly reciprocating such piston within said chamber.

11. Apparatus as claimed in claim 6 and further comprising means to move said base to enlarge and reduce the size of said base.

12. Apparatus as claimed in claim 6, wherein said means to cause a backwash of fluid comprises means to introduce backwash fluid into said chamber on the side nearer the filtrate outlet and remote from said space.

13. Apparatus as claimed in claim 6, wherein said means to cause a backwash of fluid includes means to introduce backwash fluid into said space in a direction transverse to the direction of movement of said piston.

14. Apparatus as claimed in claim 13 and further comprising a piston rod connected to said piston, said piston rod extending through said space, apertures formed in said piston rod and wherein said means to introduce backwash fluid include means to feed fluid outwardly through said apertures in said piston rod.

15. Apparatus as claimed in claim 13, wherein means are provided to introduce backwash fluid laterally through the walls of said chamber into said space.

16. Apparatus as claimed in claim 6, and further comprising a backwash outlet, adjacent said inlet, for discharging solid material removed from said fibres during the backwash.

* * * * *